(12) United States Patent
Okada et al.

(10) Patent No.: US 12,718,363 B2
(45) Date of Patent: Aug. 25, 2026

(54) IMAGE PROCESSING DEVICE, IMAGE PROCESSING METHOD, AND PROGRAM THAT DISPLAY FLUCTUATION OF FLOW VELOCITY VECTOR IN FLOW VELOCITY VECTOR IMAGE

(71) Applicant: FUJIFILM Corporation, Tokyo (JP)

(72) Inventors: Ko Okada, Tokyo (JP); Hirotaka Ito, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 293 days.

(21) Appl. No.: 18/482,007

(22) Filed: Oct. 5, 2023

(65) Prior Publication Data

US 2024/0135536 A1 Apr. 25, 2024

(30) Foreign Application Priority Data

Oct. 11, 2022 (JP) ................................ 2022-163452

(51) Int. Cl.
*G06T 7/00* (2017.01)

(52) U.S. Cl.
CPC .. *G06T 7/0012* (2013.01); *G06T 2207/30104* (2013.01)

(58) Field of Classification Search
CPC ......... G06T 7/0012; G06T 2207/30104; A61B 8/06; A61B 5/026
See application file for complete search history.

(56) References Cited

U.S. PATENT DOCUMENTS

| | | | |
|---|---|---|---|
| 9,259,205 B2 | 2/2016 | Tanaka et al. | |
| 2013/0046175 A1 | 2/2013 | Sumi | |
| 2014/0316758 A1 | 10/2014 | Yagi et al. | |
| 2014/0343906 A1 | 11/2014 | Yagi et al. | |
| 2015/0032435 A1 | 1/2015 | Yagi et al. | |
| 2015/0127031 A1 | 5/2015 | Yagi et al. | |
| 2018/0146952 A1 | 5/2018 | Du et al. | |
| 2019/0314000 A1 | 10/2019 | Du et al. | |
| 2020/0082930 A1* | 3/2020 | De Francesco ........ | G16H 10/60 |
| 2022/0233169 A1* | 7/2022 | Du ...................... | A61B 8/5284 |

FOREIGN PATENT DOCUMENTS

| | | |
|---|---|---|
| CN | 103327904 A * | 9/2013 |
| CN | 110013272 A * | 7/2019 |
| JP | 2008125736 | 6/2008 |
| JP | 2012239546 | 12/2012 |

(Continued)

OTHER PUBLICATIONS

"Notice of Reasons for Refusal of Japan Counterpart Application", issued on Mar. 24, 2026, with English translation thereof, p. 1-p. 7.

(Continued)

*Primary Examiner* — Siamak Harandi
(74) *Attorney, Agent, or Firm* — JCIPRNET

(57) ABSTRACT

An image processing device includes a processor, in which the processor is configured to acquire a flow velocity vector of a fluid in a structure, generate a flow velocity vector image obtained by visualizing a spatial distribution of the flow velocity vector, and perform display control for changing a display aspect according to a magnitude of fluctuation of the flow velocity vector, in the flow velocity vector image.

9 Claims, 12 Drawing Sheets

(56) References Cited

FOREIGN PATENT DOCUMENTS

| | | |
|---|---|---|
| JP | 2013000349 | 1/2013 |
| JP | 2015073801 | 4/2015 |
| WO | 2012073863 | 6/2012 |
| WO | 2013031741 | 3/2013 |

OTHER PUBLICATIONS

Keiichi Itatani, "The Frontiers of Blood Flow Analysis Using Non-invasive Cardiac Imaging", Imaging Information Medical , vol. 48, Jun. 2016, with English translation thereof, pp. 1-22.

Jørgen Arendt Jensen et al., "Recent advances in blood flow vector velocity imaging", 2011 IEEE International Ultrasonics Symposium, Oct. 2011, pp. 1-10.

* cited by examiner

MEDICAL SERVICE SUPPORT DEVICE
10
PROCESSOR
24
IMAGE PROCESSING
12
IMAGE PROCESSING DEVICE
EXTRACTION UNIT
24A
VASCULAR IMAGE GENERATION UNIT
24B
FLOW VELOCITY VECTOR IMAGE GENERATION UNIT
24C
VECTOR FLUCTUATION DERIVATION UNIT
24D
DISPLAY IMAGE GENERATION UNIT
24E
26
STORAGE
IMAGE PROCESSING PROGRAM
36
28
RAM
30
COMMUNICATION I/F
34
RECEPTION DEVICE
14
DISPLAY DEVICE
16
EXTERNAL I/F
32

VASCULAR IMAGE GENERATION UNIT

VASCULAR IMAGE RENDERING PROCESSING

46

44

50

50

50

50

42

48

48

STORAGE
39
FLOW VELOCITY ANALYSIS VOLUME DATA
26
VASCULAR IMAGE GENERATION UNIT
VASCULAR IMAGE
46
24C
24B
FLOW VELOCITY VECTOR IMAGE GENERATION UNIT
[A]
39
FLOW VELOCITY VECTOR DERIVATION PROCESSING
M
Phx
Phy
Phz
t
[B]
S
pi
R
D
r
v1
v2
[C]
r
pi
Phx
s
FLOW VELOCITY VECTOR DATA
52
VISUALIZE FLOW VELOCITY VECTOR OF BLOOD
54
54A
FLOW VELOCITY VECTOR IMAGE 16
46
66
54A
68
24E
DISPLAY IMAGE GENERATION UNIT
DISPLAY IMAGE
66

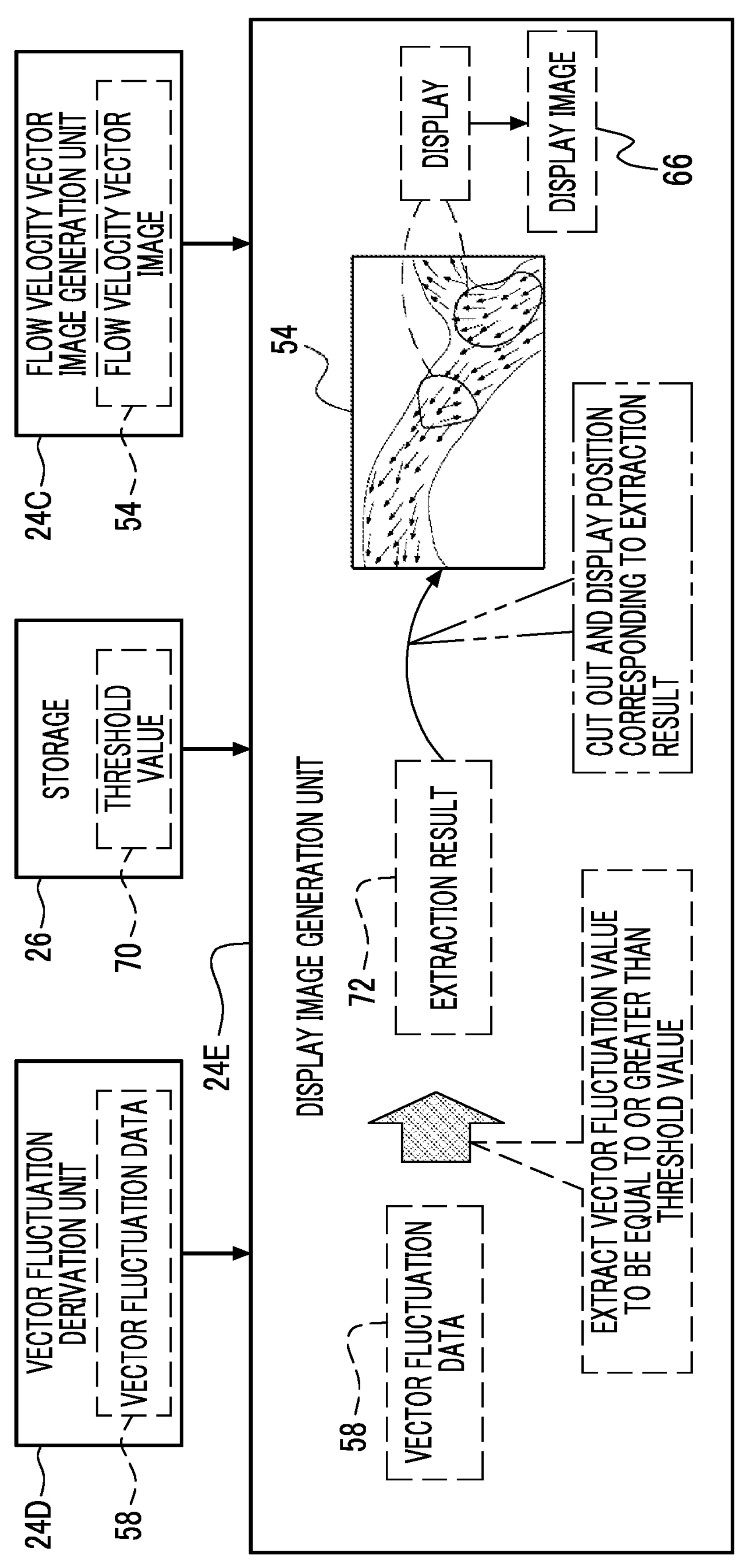
FIG. 10
24D
58
VECTOR FLUCTUATION DERIVATION UNIT
VECTOR FLUCTUATION DATA
26
70
STORAGE
THRESHOLD VALUE
24C
54
FLOW VELOCITY VECTOR IMAGE GENERATION UNIT
FLOW VELOCITY VECTOR IMAGE
24E
DISPLAY IMAGE GENERATION UNIT
58
VECTOR FLUCTUATION DATA
EXTRACT VECTOR FLUCTUATION VALUE TO BE EQUAL TO OR GREATER THAN THRESHOLD VALUE
72
EXTRACTION RESULT
CUT OUT AND DISPLAY POSITION CORRESPONDING TO EXTRACTION RESULT
54
DISPLAY
DISPLAY IMAGE
66

16
66
46
66A
54A
66A
68
DISPLAY IMAGE GENERATION UNIT
DISPLAY IMAGE
24E
66

IMAGE PROCESSING DEVICE, IMAGE PROCESSING METHOD, AND PROGRAM THAT DISPLAY FLUCTUATION OF FLOW VELOCITY VECTOR IN FLOW VELOCITY VECTOR IMAGE

CROSS-REFERENCE TO RELATED APPLICATION

This application claims priority from Japanese Patent Application No. 2022-163452, filed Oct. 11, 2022, the disclosure of which is incorporated herein by reference in its entirety.

BACKGROUND

Technical Field

A technique of the present disclosure relates to an image processing device, an image processing method, and a non-transitory storage medium storing a program.

Related Art

JP2012-239546A discloses an ultrasound diagnostic apparatus. The ultrasound diagnostic apparatus has a sound speed distribution detection unit that detects a speed distribution of ultrasonic wave in an object to be examined, and a differential value calculation unit that differentiates the speed distribution detected by the sound speed distribution detection means in a transmission and reception direction of ultrasonic wave to calculate a sound speed differential value.

JP2013-000349A discloses a method for measuring a displacement of a strain. The displacement measurement method includes a step (a) of scanning a measurement target object in a transverse axis direction with an ultrasound steering beam to generate an ultrasound echo data frame, a step (b) of obtaining, with respect to ultrasound echo data generated at a plurality of different temporal phases, a beam direction at each point of interest and a frequency in the beam direction based on a rotation angle $\varphi=\tan^{-1}(fy/fx)$, a polar angle $\theta=\cos^{-1}[fz/(fx^2+fy^2+fz^2)^{1/2}]$, and a frequency $(fx^2+fy^2+fz^2)^{1/2}$ in a case where a frequency center of gravity represents a three-dimensional frequency vector (fx, fy, fz), and a step (c) of calculating a displacement of each point of interest in the beam direction between a plurality of different temporal phases.

WO2013/031741A discloses a computer-based system that analyzes a blood flow in a target vascular site of a subject through a computer simulation, the system having a three-dimensional shape extraction unit that, by a computer, reads a captured image of the target vascular site and generates three-dimensional shape data of a lumen of the target vascular site, a fluid analysis unit that, by a computer, imposes a boundary condition regarding the blood flow to the three-dimensional shape data and obtains a state quantity (pressure and flow velocity) of the blood flow at each position of the lumen of the target vascular site by an arithmetic operation, a blood flow characteristic determination unit that, by a computer, obtains a wall shear stress vector at each position of a vascular wall surface of the target vascular site from the state quantity of the blood flow obtained by the fluid analysis unit, obtains a relative relationship between a direction of the wall shear stress vector at a specific wall surface position and a direction of a wall shear stress vector at a wall surface position surrounding the specific wall surface position, determines characteristics of the blood flow at the wall surface position from a morphology thereof, and outputs a determination result, and a display unit that, by a computer, graphically displays and outputs the determination result of the blood flow characteristic determination unit to be superimposed on a three-dimensional shape model.

SUMMARY

An embodiment according to the technique of the present disclosure provides an image processing device, an image processing method, and a program that can display fluctuation of a flow velocity vector in a flow velocity vector image to be easily ascertained.

A first aspect according to the technique of the present disclosure is an image processing device comprising a processor, in which the processor is configured to acquire a flow velocity vector of a fluid in a structure, generate a flow velocity vector image obtained by visualizing a spatial distribution of the flow velocity vector, and perform display control for changing a display aspect according to a magnitude of fluctuation of the flow velocity vector, in the flow velocity vector image.

A second aspect according to the technique of the present disclosure is an image processing method comprising acquiring a flow velocity vector of a fluid in a structure, generating a flow velocity vector image obtained by visualizing a spatial distribution of the flow velocity vector, and performing display control for changing a display aspect according to a magnitude of fluctuation of the flow velocity vector, in the flow velocity vector image.

A third aspect according to the technique of the present disclosure is a non-transitory storage medium storing a program that causes a computer to execute a process, the process comprising acquiring a flow velocity vector of a fluid in a structure, generating a flow velocity vector image obtained by visualizing a spatial distribution of the flow velocity vector, and performing display control for changing a display aspect according to a magnitude of fluctuation of the flow velocity vector, in the flow velocity vector image.

BRIEF DESCRIPTION OF THE DRAWINGS

FIG. 4 is a conceptual diagram showing an example of processing contents of a vascular image generation unit.

FIG. 10 is a conceptual diagram showing an example of processing contents of the display image generation unit.

DETAILED DESCRIPTION

An example of an embodiment of an image processing device, an image processing method, and a non-transitory storage medium storing a program according to the technique of the present disclosure will be described referring to the accompanying drawings.

First Embodiment

Figure 1:
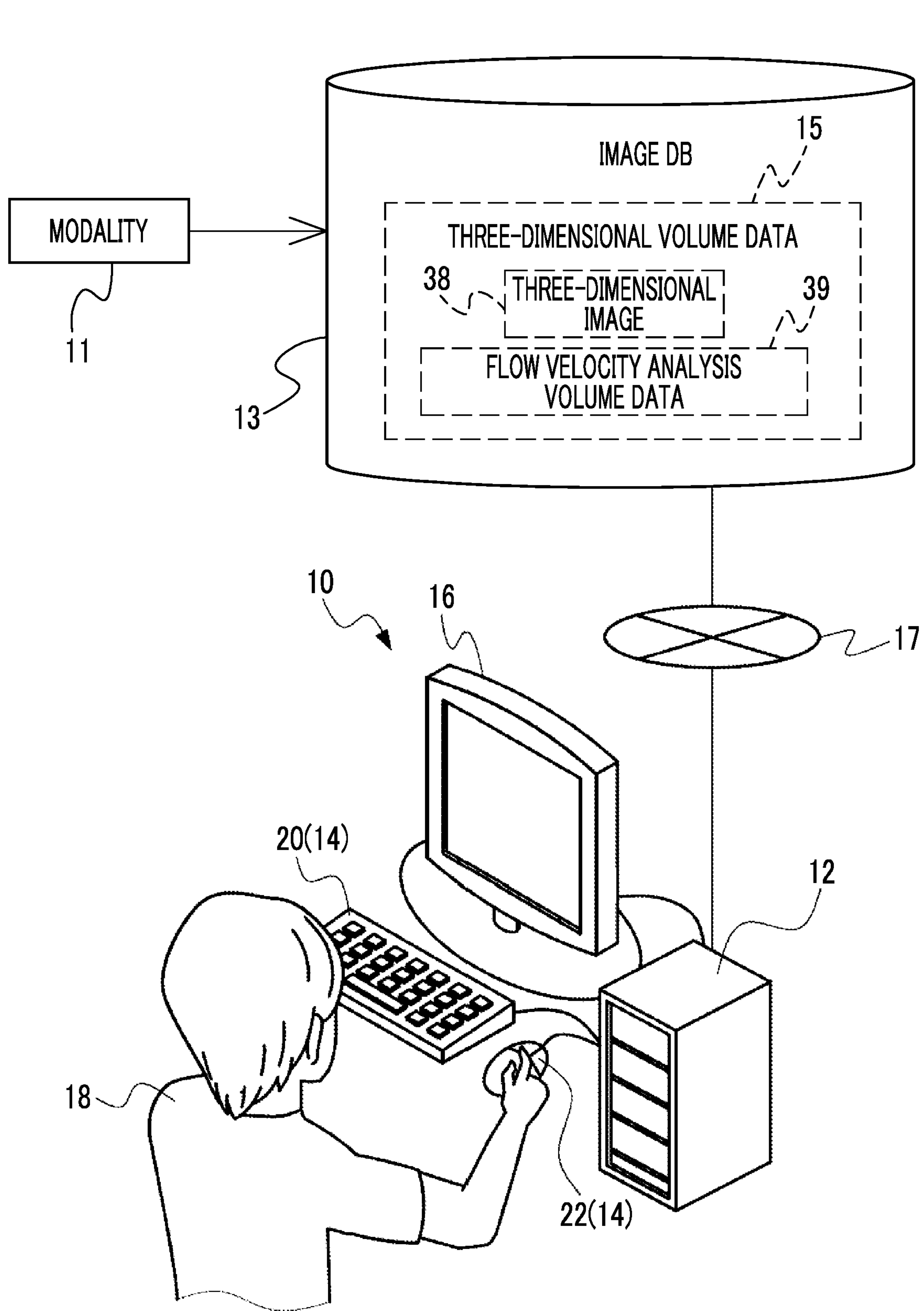
FIG. 1 is a conceptual diagram showing a schematic configuration of a medical service support device.

As shown in FIG. 1 as an example, a medical service support device 10 comprises an image processing device 12, a reception device 14, and a display device 16, and is used by a user 18. Here, the user 18 is a user of the medical service support device 10, and examples of the user 18 include a physician and/or a technician. Examples of the user of the medical service support device 10 include an operator of the reception device 14 or a target person who is managed with a user ID, a password, and the like in the medical service support device 10, and who has a user ID having logged in to the medical service support device 10 through on log-in processing of receiving an input of management information regarding a user ID, a password, and the like and performing authentication based on the management information.

The medical service support device 10 presents, for example, an image obtained by visualizing a flow of blood in a blood vessel to the user 18. In performing visualization, three-dimensional volume data 15 of the inside of a body of a subject is acquired in advance by a magnetic resonance imaging (MRI) apparatus as a modality 11. The three-dimensional volume data 15 includes a three-dimensional image 38 and flow velocity analysis volume data 39. The three-dimensional volume data 15 is stored in an image database 13. The medical service support device 10 is connected to the image database 13 via a network 17. The medical service support device 10 acquires the three-dimensional volume data 15 from the image database 13 and provides an image obtained by visualizing the flow of blood based on the three-dimensional volume data 15 to the user 18. The modality 11 that acquires the three-dimensional volume data 15 including the flow velocity analysis volume data 39 may be a computed tomography (CT) apparatus, an ultrasound apparatus, or the like.

The reception device 14 is connected to the image processing device 12. The reception device 14 receives an instruction from the user 18. The reception device 14 has a keyboard 20, a mouse 22, and the like. The instruction received by the reception device 14 is acquired by a processor 24. The keyboard 20 and the mouse 22 shown in FIG. 1 are merely an example. As the reception device 14, any one of the keyboard 20 or the mouse 22 may be provided. As the reception device 14, for example, at least one of an approach input device that receives an approach input, a voice input device that receives a voice input, or a gesture input device that receives a gesture input may be applied instead of the keyboard 20 and/or the mouse 22. The approach input device is, for example, a touch panel, a tablet, or the like.

The display device 16 is connected to the image processing device 12. Examples of the display device 16 include an electro-luminescence (EL) display and a liquid crystal display. The display device 16 displays various kinds of information (for example, an image, text, and the like) under the control of the image processing device 12.

Figure 2:
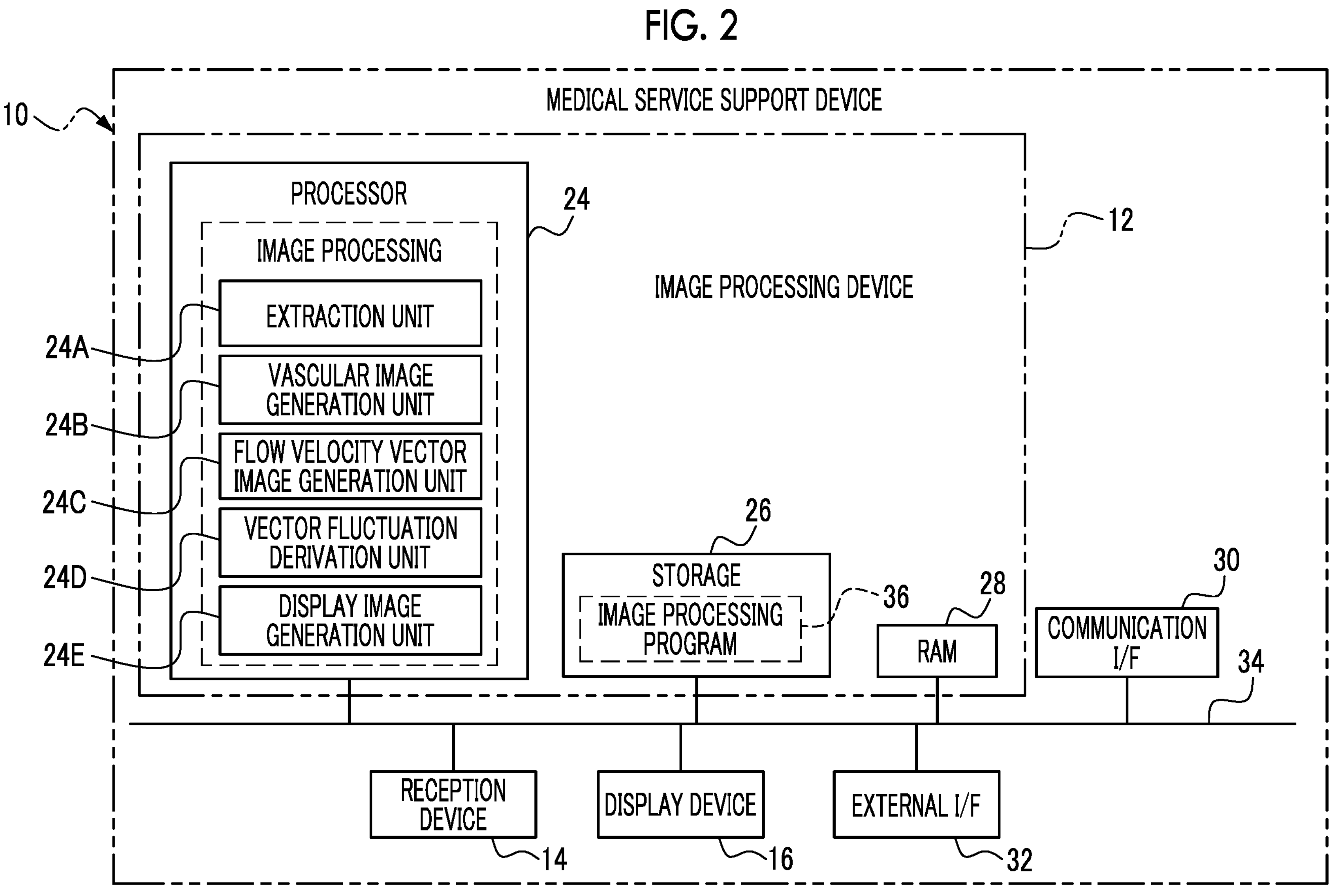
FIG. 2 is a block diagram showing an example of a hardware configuration of an electric system of the medical service support device.

As shown in FIG. 2 as an example, the medical service support device 10 comprises a communication interface (I/F) 30, an external I/F 32, and a bus 34, in addition to the image processing device 12, the reception device 14, and the display device 16.

The image processing device 12 comprises a processor 24, a storage 26, and a random access memory (RAM) 28. The processor 24, the storage 26, the RAM 28, the communication I/F 30, and the external I/F 32 are connected to the bus 34. The image processing device 12 is an example of an "image processing device" and a "computer" according to the technique of the present disclosure, and the processor 24 is an example of a "processor" according to the technique of the present disclosure.

A memory is connected to the processor 24. The memory includes the storage 26 and the RAM 28. The processor 24 has, for example, a central processing unit (CPU) and a graphics processing unit (GPU). The GPU operates under the control of the CPU and is responsible for execution of processing regarding an image.

The storage 26 is a nonvolatile storage device that stores various programs, various parameters, and the like. Examples of the storage 26 include a flash memory (for example, an electrically erasable and programmable read only memory (EEPROM) or a solid state drive (SSD)) and/or a hard disk drive (HDD). A flash memory and an HDD are merely an example, and at least one of a flash memory, an HDD, a magnetoresistive memory, or a ferroelectric memory may be used as the storage 26.

The RAM 28 is a memory in which information is temporarily stored and is used as a work memory by the processor 24. Examples of the RAM 28 include a dynamic random access memory (DRAM) and a static random access memory (SRAM).

The communication I/F 30 is connected to a network (not shown). The network may be configured with at least one of a local area network (LAN) or a wide area network (WAN). An external device (not shown) and the like are connected to the network, and the communication I/F 30 controls transfer of information with an external communication apparatus via the network. The external communication apparatus may include, for example, at least one of a computed tomography (CT) apparatus, a magnetic resonance imaging (MRI) apparatus, a personal computer, or a smart device. For example, the communication I/F 30 transmits information depending on a request from the processor 24 to the external communication apparatus via the network. The communication I/F 30 receives information transmitted from the external communication apparatus and outputs the received information to the processor 24 via the bus 34.

The external I/F 32 controls transfer of various kinds of information with an external device (not shown) outside the medical service support device 10. The external device may be, for example, at least one of a smart device, a personal computer, a server, a universal serial bus (USB) memory, a memory card, or a printer. An example of the external I/F 32 is a USB interface. The external device is connected directly or indirectly to the USB interface.

An image processing program 36 is stored in the storage 26. The processor 24 reads out the image processing program 36 from the storage 26 and executes the read-out image processing program 36 on the RAM 28 to execute image processing. The image processing is realized by the processor 24 operating as an extraction unit 24A, a vascular image generation unit 24B, a flow velocity vector image generation unit 24C, a vector fluctuation derivation unit 24D, and a display image generation unit 24E. The image processing program 36 is an example of a "program" according to the technique of the present disclosure.

The image processing that is executed by the processor 24 is processing of performing analysis of (that is, blood flow analysis) the flow of blood in the blood vessel based on the flow velocity analysis volume data 39 and visualizing the blood flow based on an analysis result. With such image processing, it is possible to ascertain a lesion that occurs in the blood vessel or a state of a blood flow. To ascertain the lesion or the like from the visualized image of the blood flow, the user often focuses on a region where a locally characteristic flow with respect to a global flow along a blood vessel running direction. In general, in a visualization method of the blood flow, an orientation of the flow velocity is displayed as geometrical information called an orientation of, for example, a mark, such as an arrow. Note that, in this case, because there is a large number of marks, such as arrows, and the marks are displayed in an overlapping manner, only an entire trend of the blood flow is read, and it may be difficult to ascertain a characteristic of a local blood flow having large fluctuation in blood flow with respect to a global flow. Accordingly, in the technique of the present disclosure, image processing capable of performing display in such a manner to easily ascertain a characteristic of a local blood flow is executed.

Figure 3:
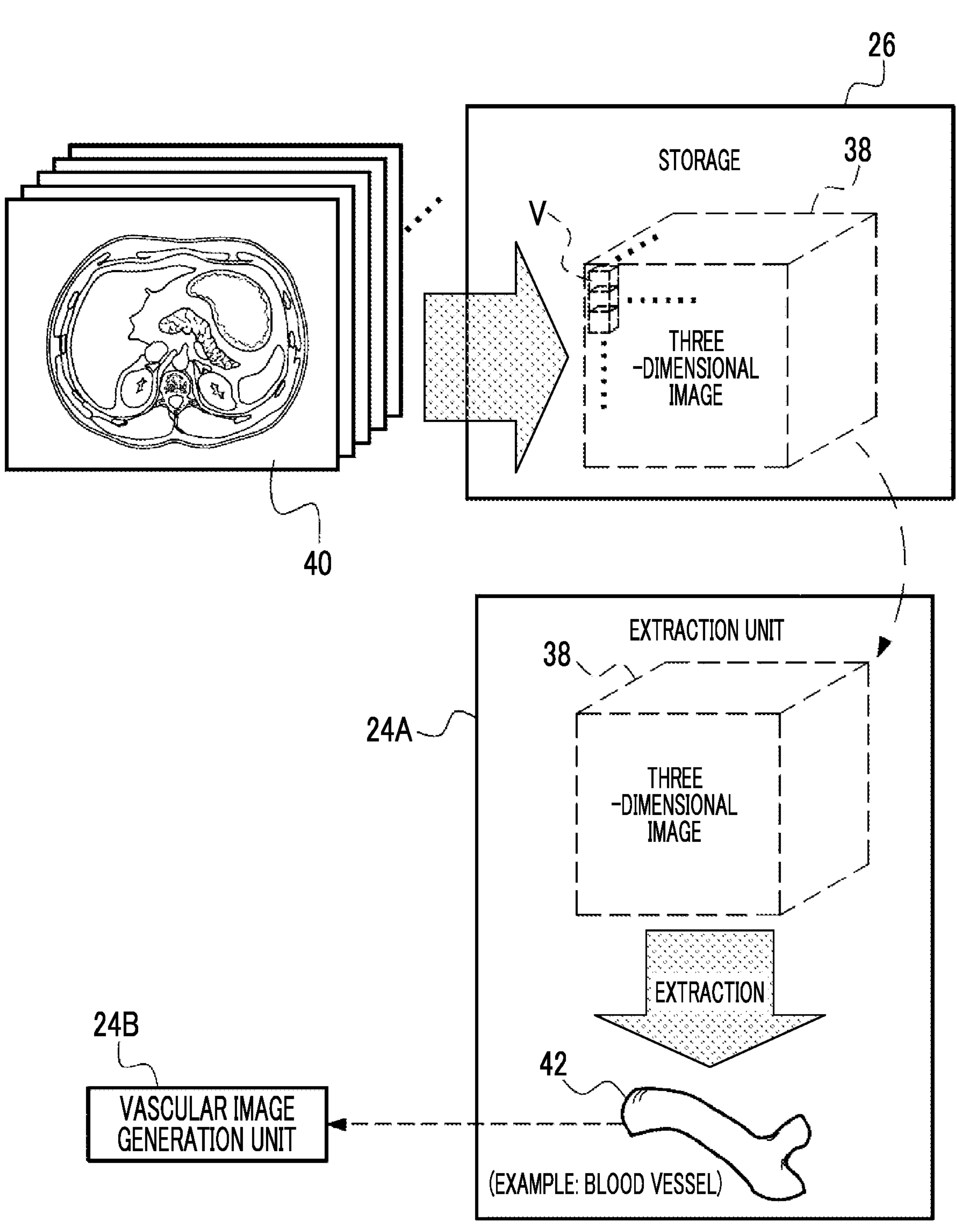
FIG. 3 is a conceptual diagram showing an example of processing contents of an extraction unit.

As shown in FIG. 3 as an example, the three-dimensional image 38 acquired from the image database 13 is stored. The three-dimensional image 38 is volume data in which a plurality of two-dimensional slice images 40 are piled, and is composed of a plurality of voxels V as a unit of a three-dimensional pixel. In the example shown in FIG. 3, although two-dimensional slice images of a transverse plane (that is, an axial cross section) are shown as the two-dimensional slice images 40, the technique of the present disclosure is not limited thereto, and two-dimensional slice images of a coronal plane (that is, a coronal cross section) can also be extracted and two-dimensional slice images of a sagittal plane (that is, a sagittal cross section) can also be extracted, from the three-dimensional image 38. Aposition of each of all voxels V that define the three-dimensional image 38 is specified by three-dimensional coordinates. Each voxel V of the three-dimensional image 38 is given, for example, a unique identifier of each organ, and opacity and color information of red (R), green (G), and blue (B) are set in the identifier of each organ (hereinafter, these are referred to as "voxel data"). The opacity and the color information can be suitably changed.

The extraction unit 24A acquires the three-dimensional image 38 from the storage 26 and extracts a three-dimensional vascular image 42 from the acquired three-dimensional image 38. The three-dimensional vascular image 42 is a three-dimensional image that shows a blood vessel. For example, a plurality of three-dimensional vascular images 42 are included in the three-dimensional image 38, and a peculiar identifier is given to each three-dimensional vascular image 42. The three-dimensional vascular image 42 is extracted from the three-dimensional image 38 with designation of a blood vessel to be a target of visualization by the reception device 14. For example, the extraction unit 24A extracts the three-dimensional vascular image 42 corresponding to an identifier received by the reception device 14, from the three-dimensional image 38. The blood vessel is an example of a "structure" and an "anatomical site" according to the technique of the present disclosure, and blood is an example of a "fluid" according to the technique of the present disclosure.

Here, although the three-dimensional vascular image 42 is illustrated, this is merely an example, and an image showing a tubular anatomical site (for example, dura mater or lymphatic vessel) inside a body may be employed. A method in which the three-dimensional vascular image 42 is extracted using the peculiar identifier is merely an example, and a method in which the three-dimensional vascular image 42 designated by the user 18 using any means through the reception device 14 is extracted by the extraction unit 24A may be employed or a method in which the three-dimensional vascular image 42 is extracted by the extraction unit 24A using image recognition processing by an artificial intelligence (AI) system and/or a pattern matching system may be employed.

Figure 4:
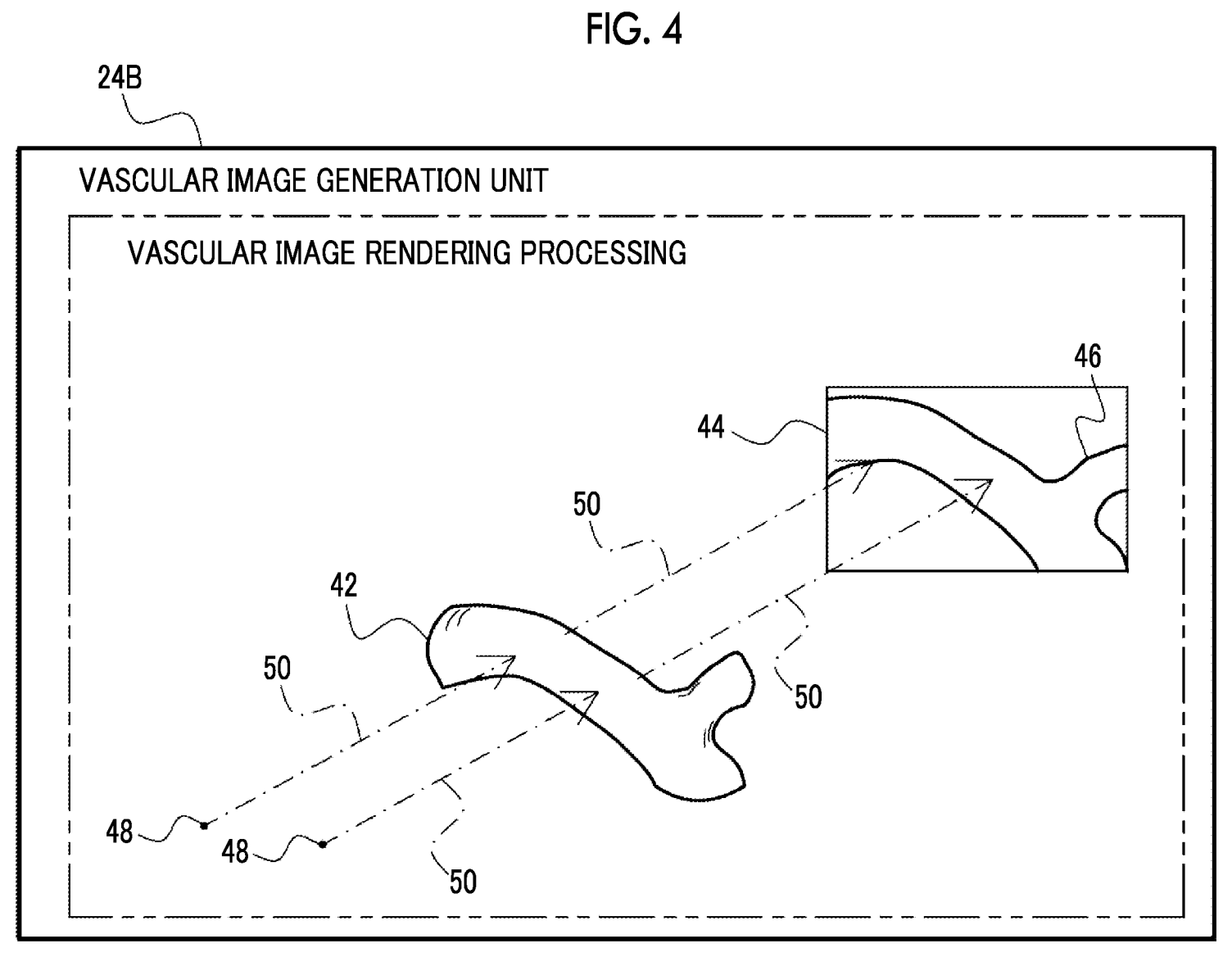

As shown in FIG. 4 as an example, the vascular image generation unit 24B executes vascular image rendering processing. The vascular image generation unit 24B performs ray casting to perform rendering for projecting the three-dimensional vascular image 42 onto a projection plane 44. A projection image obtained by projecting the three-dimensional vascular image 42 onto the projection plane 44 is referred to as a vascular image 46. Because a screen of the display device 16 is two-dimensional, such rendering is performed in displaying the three-dimensional image 38 on the screen of the display device 16. The vascular image 46 is an image that shows a form of a blood vessel, and is an image that is used in superimposition display on a flow velocity vector image 54 showing a flow of blood described below.

FIG. 4 is a schematic view illustrating rendering. The projection plane 44 is a virtual plane defined with a resolution set in advance. In rendering, a viewpoint 48 for viewing the three-dimensional vascular image 42 is set, and the vascular image generation unit 24B generates the vascular image 46 based on the set viewpoint 48. FIG. 4 shows a parallel projection method. In the parallel projection method, ray casting for projecting a plurality of virtual rays 50 onto the three-dimensional vascular image 42 from a plurality of viewpoints 48 set within a plane parallel to the projection plane 44 is performed, where pixel values corresponding voxel data on a plurality of rays 50 are projected onto the projection plane 44, and the vascular image 46 as a projection image is obtained. Each pixel (that is, pixel) of the projection plane 44 has a pixel value corresponding to voxel data on each ray 50. While there are a plurality of pieces of voxel data on the ray 50 passing through the three-dimensional vascular image 42, for example, in a case where a surface of the three-dimensional vascular image 42 is projected, the pixel value corresponding to voxel data of the surface of the three-dimensional vascular image 42 intersecting the ray 50 is projected onto the projection plane 44.

A position of each viewpoint 48 with respect to the three-dimensional vascular image 42 is changed, for example, in response to an instruction received by the reception device 14, and accordingly, the vascular image 46 in a case where the three-dimensional vascular image 42 is observed from various directions is projected onto the projection plane 44. The vascular image 46 projected onto the projection plane 44 is displayed on the display device 16 or is stored in a predetermined storage device (for example, the storage 26), for example. Here, although the example of rendering by the parallel projection method has been illustrated, this is merely an example, and for example, rendering by a perspective projection method for projecting a plurality of rays radially from one viewpoint may be performed. In rendering, in addition to simple conversion of the three-dimensional image into a two-dimensional image, shading processing of applying shading or the like may be executed.

Figure 5:
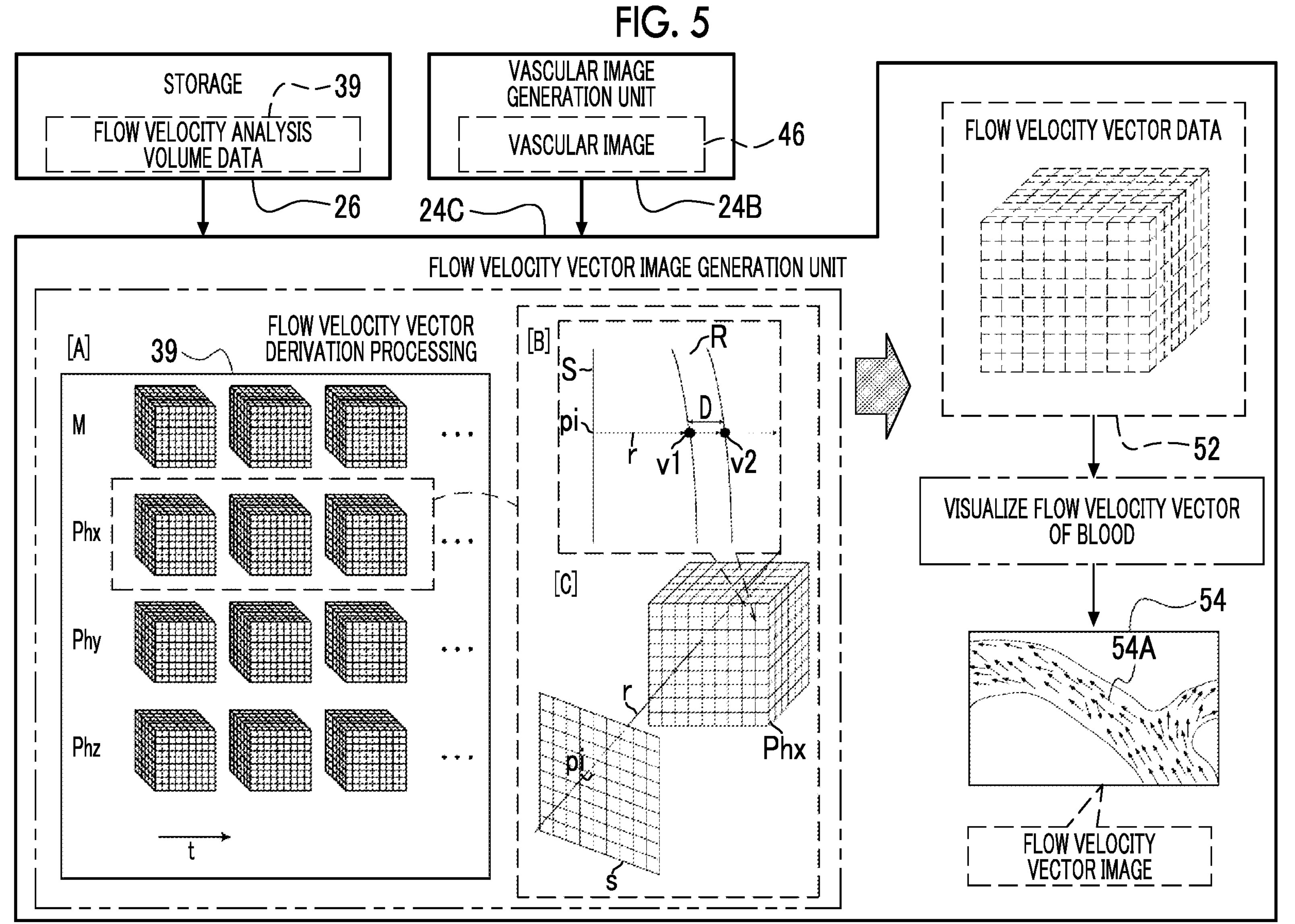
FIG. 5 is a conceptual diagram showing an example of processing contents of a flow velocity vector image generation unit.

As shown in FIG. 5 as an example, the flow velocity vector image generation unit 24C first executes flow velocity vector derivation processing. The flow velocity vector derivation processing is processing of deriving a distribution of a flow velocity vector in a blood vessel using the flow velocity analysis volume data 39. The flow velocity vector image generation unit 24C acquires the flow velocity analysis volume data 39 from the storage 26. The flow velocity analysis volume data 39 is volume data captured by a three-dimensional cine phase contrast magnetic resonance method using an MRI apparatus as the modality 11. The flow velocity vector image generation unit 24C generates the flow velocity vector image 54 using known four-dimensional flow MRI for performing blood flow analysis based on such volume data.

As shown in [A] of FIG. 5, the flow velocity analysis volume data 39 is composed of magnitude data M and volume data having phase data Phx in an X axis direction, phase data Phy in a Y axis direction, and phase data Phz in a Z axis direction obtained in a predetermined period along a time t. The phase data Phx in the X axis direction, the phase data Phy in the Y axis direction, and the phase data Phz in the Z axis direction are obtained by encoding (velocity encoding; VENC) a measurement result of the three-dimensional cine phase contrast magnetic resonance method in the X axis direction, the Y axis direction, and the Z axis direction. The phase data Phx, Phy, and Phz are data representing flow velocities in the respective axis directions, and three-dimensional flow velocity vector of each voxel V is obtained from the three pieces of phase data. As the period in which the volume data is acquired, for example, a period set within an average heartbeat interval is employed. The blood flow periodically fluctuates in synchronization with the heartbeat. For this reason, a data acquisition timing is determined with the heartbeat interval as a reference, so that data indicating the periodic fluctuation of the blood flow can be acquired.

As shown in [C] of FIG. 5, for each of the passes phase data Phx, Phy, and Phz, determination about whether or not each voxel through which a ray r that extends from one pixel pi of the projection plane in a vertical direction (hereinafter, referred to as a projection direction) with respect to the projection plane S passes is a vascular region is performed based on a result of the extraction unit 24A. For the voxel of the vascular region, a velocity component in each axis direction is obtained from each voxel of each of the phase data Phx, Phy, and Phz to sample a three-dimensional flow velocity vector. In [C] of FIG. 5, although an example where the phase data Phx in the X axis direction is projected onto the projection plane S has been shown, for the phase data Phy in the Y axis direction and the phase data Phz in the Z axis direction, similarly, a velocity component is obtained from a value of a voxel through which the ray passes, and as a result, the velocity components in the three directions are obtained. Registration is performed between the vascular image 46 in which the vascular region is extracted by the extraction unit 24A and each of the phase data Phx, Phy, and Phz captured by the three-dimensional cine phase contrast magnetic resonance method such that the same positions correspond to each other.

As shown in [B] of FIG. 5, the ray r is sent from the pixel pi of the projection plane S, and a three-dimensional flow velocity vector of a voxel v1 where the ray r enters a vascular region R is acquired. In addition, the ray r extends, and then, three-dimensional flow velocity vectors of voxels in a section D until the ray r leaves the vascular region R are sampled. Specifically, while the ray r extends from a position v1 where the ray r enters the vascular region R to a position v2 where the ray r leaves the vascular region R, the three-dimensional flow velocity vectors are sampled.

Here, although a case where the three-dimensional flow velocity vector is acquired from the volume data captured by the three-dimensional cine phase contrast magnetic resonance method has been described, this is merely an example. A flow velocity vector may be acquired by performing blood flow analysis (computational fluid dynamics; CFD) using numerical fluid dynamics with the three-dimensional vascular image 42 extracted by the extraction unit 24A. For example, a CT apparatus can be used as the modality 11, and blood flow analysis can be performed based on three-dimensional vascular images 42 extracted from respective CT images captured in time series by the CT apparatus. As the CT images, for example, angiographic CT images in which blood can be highlighted are used. Instead of the three-dimensional cine phase contrast magnetic resonance method by the MRI apparatus shown in the present example, angiographic MRI images can be acquired by the MRI apparatus and blood flow analysis can be performed based on the angiographic MRI images.

Alternatively, an ultrasound apparatus may be used as the modality 11, three-dimensional ultrasound images captured in time series may be acquired by Doppler measurement, and a flow velocity vector may be acquired using velocity information in vascular regions acquired based on the ultrasound images.

As a result of the flow velocity vector derivation processing executed in the flow velocity vector image generation unit 24C, flow velocity vector data 52 is obtained. The flow velocity vector data 52 is velocity distribution data indicating a spatial distribution of respective velocity components in three-dimensional directions in the blood vessel. The flow velocity vector image generation unit 24C displays the flow velocity vector of blood on the vascular image 46 based on the flow velocity vector data 52 in a superimposed manner to visualize the distribution of the flow velocity vector of blood at each location of the blood vessel. Specifically, the flow velocity vector image generation unit 24C acquires the vascular image 46 from the vascular image generation unit 24B. The flow velocity vector image generation unit 24C extracts a flow velocity vector corresponding to position coordinates of each pixel of the vascular image 46 from the flow velocity vector data 52. Then, the flow velocity vector image generation unit 24C generates a two-dimensional image that shows an arrow 54A according to a velocity and a direction of the extracted flow velocity vector and displays the two-dimensional image for each corresponding pixel of the vascular image 46. In this way, the flow velocity vector image generation unit 24C generates the flow velocity vector image 54. The flow velocity vector image 54 is an example of a “flow velocity vector image” according to the technique of the present disclosure. Although the flow velocity vector image 54 of the present example uses the arrow 54A as a mark indicating a flow velocity vector, instead of an arrow, a mark having a polygonal shape, such as a triangular shape, may be used or a mark with a circle or the like attached to one end of a straight line may be used. In the present example, although the direction of the flow velocity vector shown by the flow velocity vector data 52 is shown by an inclination and an arrowhead of the arrow 54A, the velocity of the flow velocity vector shown by the flow velocity vector data 52 is shown by a length of a shaft of the arrow 54A, a display aspect of the mark is not limited thereto as long as at least one of the direction or the velocity of the flow velocity vector data 52 can be visualized. For example, the direction of the flow velocity vector shown by the flow velocity vector data 52 may be shown by a central axis of a mark having a polygonal shape and a direction of a protruding portion, and the velocity of the flow velocity vector shown by the flow velocity vector data 52 may be shown by a thickness of a shaft, a color of a mark, or the like that is different according to the velocity.

Figure 6:
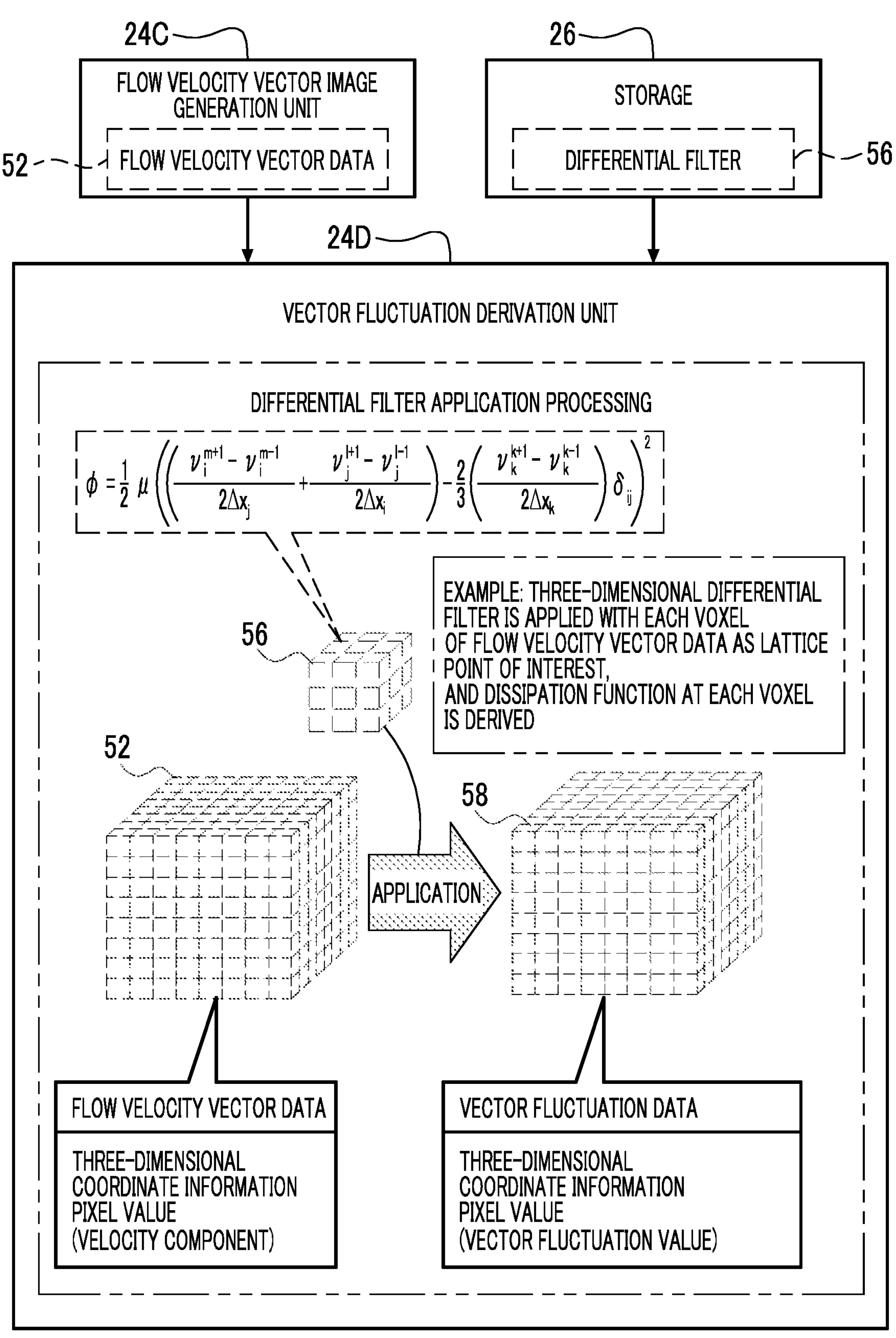
FIG. 6 is a conceptual diagram showing an example of processing contents of a vector fluctuation derivation unit.

As shown in FIG. 6 as an example, the vector fluctuation derivation unit 24D executes differential filter application processing on the flow velocity vector data 52 to derive the fluctuation of the flow velocity vector. Here, the fluctuation of the flow velocity vector indicates at least one of the velocity or the direction of the flow velocity vector. For example, the fluctuation of the flow velocity vector indicates fluctuation between a velocity shown by a flow velocity vector at a specific voxel and a velocity of a flow velocity vector at a voxel adjacent to the specific voxel. As another example, the fluctuation of the flow velocity vector indicates fluctuation between a direction of a flow velocity vector at a specific voxel and a direction of a flow velocity vector at a voxel adjacent to the specific voxel. As another example, the fluctuation of the flow velocity vector indicates fluctuation between a velocity and a direction shown by a flow velocity vector at a specific voxel and a velocity and a direction shown by a flow velocity vector at a voxel adjacent to the specific voxel. Hereinafter, a case where both the velocity and the direction of the flow velocity vector fluctuate will be described as an example. The vector fluctuation derivation unit 24D acquires the flow velocity vector data 52 from the flow velocity vector image generation unit 24C. The vector fluctuation derivation unit 24D acquires a differential filter 56 from the storage 26. The differential filter 56 is a 3×3×3 three-dimensional filter corresponding to the voxels of the flow velocity vector data 52.

Here, the differential filter 56 is a filter that derives a dissipation function at each voxel with each voxel of the flow velocity vector data 52 as a lattice point of interest. The differential filter 56 is derived by applying a known Navier-Stokes equation that describes motion of a fluid. Hereinafter, a dissipation function (will be schematically described. Motion of a viscous fluid, such as blood, causes frictional heat inside, and part of mechanical energy of the fluid becomes heat and is irreversibly dissipated. The dissipation function (that indicates energy to be dissipated per unit volume and unit time is obtained by the following expression for a Newtonian fluid. Here, blood flowing in the blood vessel is approximately regarded as a Newtonian fluid.

$$\Phi = \frac{1}{2}\mu\left(\left(\frac{\partial v_i}{\partial x_j} + \frac{\partial v_j}{\partial x_i}\right) - \frac{2}{3}(\nabla \cdot v)\delta_{ij}\right)^2$$

Note that suffixes of variables follow the Einstein's notation. μ is a coefficient of viscosity of blood, $v_i$ is an i-direction component of a velocity, $x_i$ is spatial coordinates, and $\delta_{ij}$ is a Kronecker delta. Here, $(\partial v_i)/(\partial x_j)$ is partial differential regarding each spatial direction (that is, in three dimensions, an x direction, a y direction, and a z direction) of a velocity component, and it can be understood that, in a case where a velocity component in a certain direction sharply changes in a spatial direction, that is, in a case where a magnitude or direction of a velocity suddenly changes, the dissipation function (takes a large value. For this reason, a magnitude of change in magnitude or direction of the velocity can be evaluated based on the quantity of the dissipation function (D.

The flow velocity vector data 52 is velocity distribution data in a space, and in general, the velocity distribution data is obtained as a set of velocities observed on lattice points arranged at regular intervals in the space like image data. That is, the flow velocity vector data 52 has, for each voxel, three-dimensional coordinate information (that is, position coordinates in a three-dimensional space) and a velocity component as a voxel value. Accordingly, in a case where $(\partial v_i)/(\partial x_j)$ is digitized and approximated as a lattice point width $\Delta x_i$ by a central difference, the following expression is obtained.

$$\Phi = \frac{1}{2}\mu\left(\left(\frac{v_i^{m+1} - v_i^{m-1}}{2\Delta x_j} + \frac{v_j^{l+1} - v_j^{l-1}}{2\Delta x_i}\right) - \frac{2}{3}\left(\frac{v_k^{k+1} - v_k^{k-1}}{2\Delta x_k}\right)\delta_{ij}\right)^2$$

However, upper right suffixes 1, m, and k represent positions of discrete points on i, j, and k axes, respectively. From the above-described expression, a value of a dissipation function Φ of one lattice point of interest in a three-dimensional space represented by three axes of i, j, and k can be obtained from adjacent points of the lattice point of interest. For example, as shown in the above-described expression, in a case where a lattice point of interest on the i axis is "m", a differential value of a velocity in an i axis direction at the lattice point of interest "m" is derived by dividing a difference in velocity v between "m+1" and "m−1" as two adjacent points of the lattice point of interest by the lattice point width. The differential value means fluctuation of a velocity component.

Processing of deriving the dissipation function (representing the fluctuation of the velocity component of the lattice point of interest from the difference in velocity between two adjacent points can be handled similarly to spatial filtering processing on image data. For this reason, as shown in FIG. 6, the value of the dissipation function (of each lattice point of interest corresponding to each voxel of the flow velocity vector data 52 can be derived by applying the differential filter 56 to the flow velocity vector data 52. Because the flow velocity vector data 52 is three-dimensional, the differential filter 56 is also a three-dimensional filter as an example. Here, although a form example where the differential filter 56 is the 3×3×3 three-dimensional filter has been described, this is merely an example, and the number of squares of each direction component of the differential filter 56 can be suitably set.

With the application of the differential filter 56 to the flow velocity vector data 52, the dissipation function Φ of each voxel is obtained. As described above, the dissipation function Φ corresponds to the fluctuation of the flow velocity vector. That is, with the application of the differential filter 56 to the flow velocity vector data 52, vector fluctuation data 58 is obtained. The vector fluctuation data 58 is data indicating the fluctuation of the flow velocity vector of each voxel. The vector fluctuation data 58 has, for each voxel, three-dimensional coordinate information (that is, position coordinates in a three-dimensional space) and a fluctuation value of a flow velocity vector as a voxel value.

Figure 7:
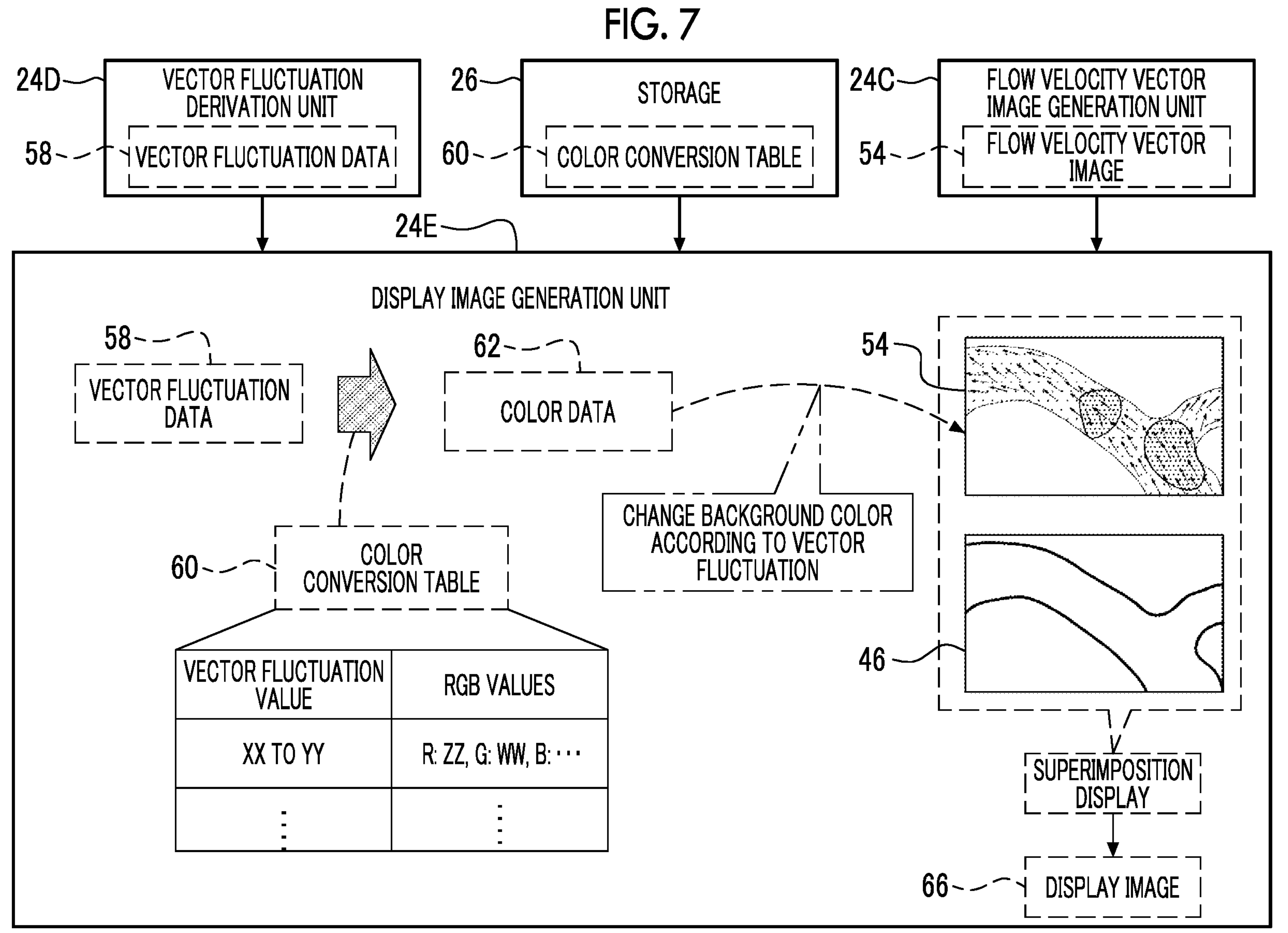
FIG. 7 is a conceptual diagram showing an example of processing contents of a display image generation unit.

As shown in FIG. 7 as an example, the display image generation unit 24E acquires the vector fluctuation data 58 from the vector fluctuation derivation unit 24D. The display image generation unit 24E acquires a color conversion table 60 from the storage 26. The display image generation unit 24E generates color data 62 based on the vector fluctuation data 58 using the color conversion table 60. The color conversion table 60 is, for example, a table that has the vector fluctuation value as an input value and RGB (that is, red (R), green (G), and blue (B)) values as output values. The color data 62 is data for expressing a magnitude of the fluctuation value of the flow velocity vector in the vector fluctuation data 58 with color. In the color conversion table 60, for example, as the vector fluctuation value is smaller, the color is set close to blue, and as the vector fluctuation value is greater, the color is set close to red. With this, the color changes according to the magnitude of the fluctuation of the flow velocity vector. The color data 62 is used as a background color of the arrow 54A in the flow velocity vector image 54 in which the orientation of the flow velocity vector is indicated by the arrow 54A. In this way, the display image generation unit 24E changes a display aspect according to the magnitude of the fluctuation of the flow velocity vector in the flow velocity vector image 54. In the present example, as the display aspect, the background color of the arrow 54A that is a mark indicating the direction of the flow velocity vector is changed by the color data 62. For this reason, for example, even in a case where the arrows 54A are dense in the flow velocity vector image 54, because the background color of the arrow 54A changes, it is easy to ascertain a place where the fluctuation of the flow velocity vector is relatively large compared to other regions.

As the vector fluctuation value for use in determining the display aspect, all vector fluctuation values included in the vector fluctuation data 58 may be used or part of vector fluctuation values may be used. For example, a representative value, such as a maximum value, a median value, an average value, or a mode, of the vector fluctuation values in a region set in advance may be extracted, and the display aspect may be determined based on the extracted representative value. For the number of flow velocity vectors displayed by marks, such as arrows, in the flow velocity vector image 54, the flow velocity vectors of all voxels are not required to be used, and only a representative value, such as a maximum value, a median value, an average value, or a mode, of the flow velocity vectors in a region set in advance, may be used. Thus, it is possible to reduce a calculation amount required for determining the display aspect or to reduce the number of arrows in the flow velocity vector image 54.

The display image generation unit 24E acquires the flow velocity vector image 54 from the flow velocity vector image generation unit 24C. The display image generation unit 24E displays the RGB values corresponding to each pixel of the flow velocity vector image 54 based on the color data 62. Then, the display image generation unit 24E displays the colored flow velocity vector image 54 and the vascular image 46 in a superimposed manner to generate a display image 66.

Figure 8:
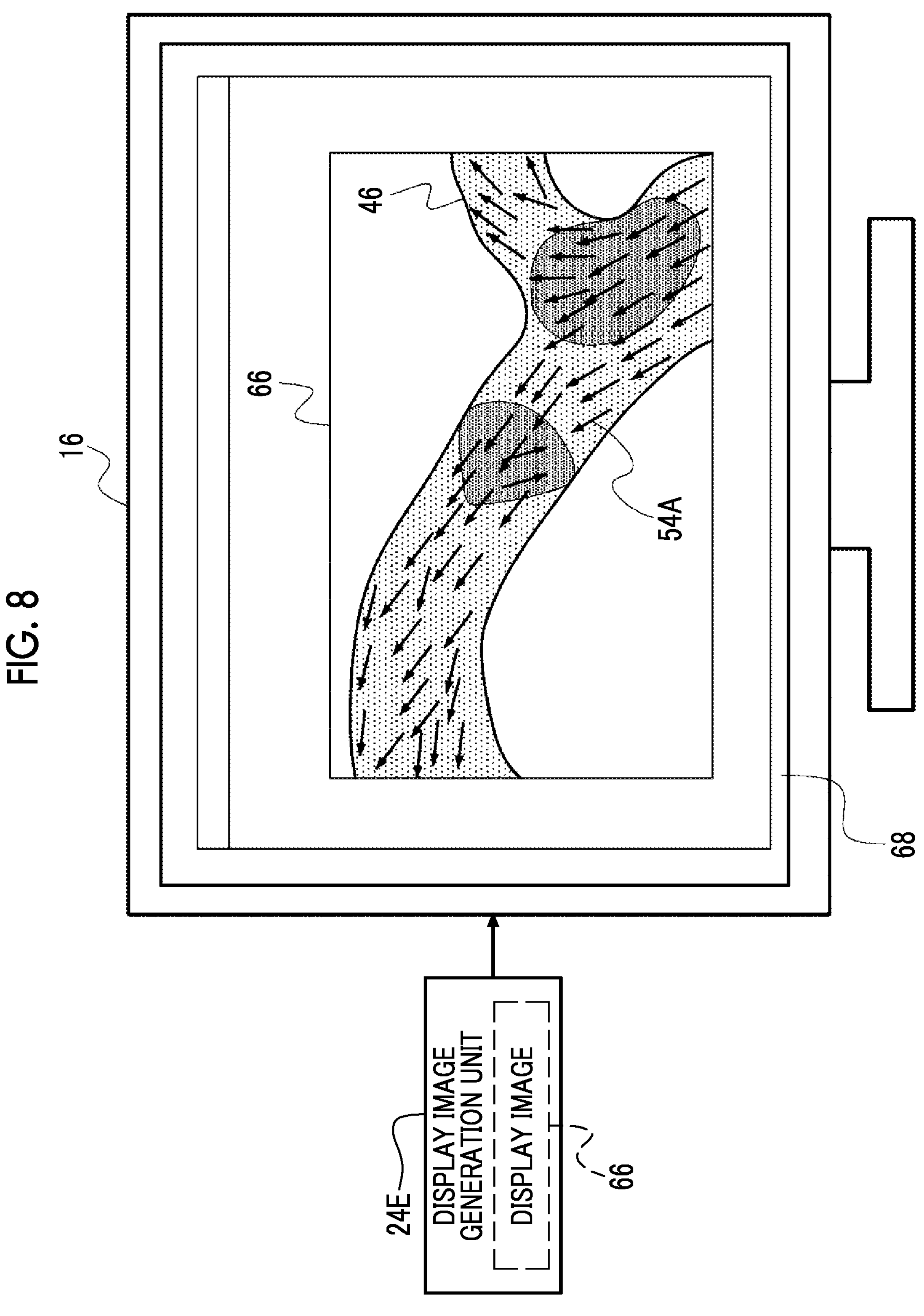
FIG. 8 is a conceptual diagram showing an example of an aspect in which a display image is displayed on a display device.

As shown in FIG. 8 as an example, the display image generation unit 24E generates a screen 68 including the display image 66 and outputs information indicating the screen 68 to the display device 16. Specifically, the display image generation unit 24E performs graphical user interface (GUI) control for displaying the display image 66 to display the screen 68 on the display device 16. The GUI control is an example of "display control" according to the technique of the present disclosure.

As described above, the background color of the flow velocity vector image 54 is changed according to the fluctuation of the flow velocity vector. As a result, in the display image 66, because a region with large fluctuation of the flow velocity vector on the vascular image 46 is displayed in color different from other regions, the user easily recognizes the region with large fluctuation of the flow velocity vector.

Next, the operations of the medical service support device 10 will be described referring to FIG. 9.

First, an example of a flow of image processing that is executed by the processor 24 of the medical service support device 10 will be described referring to FIG. 9. The flow of the image processing shown in FIG. 9 is an example of an "image processing method" according to the technique of the present disclosure.

Figure 9:
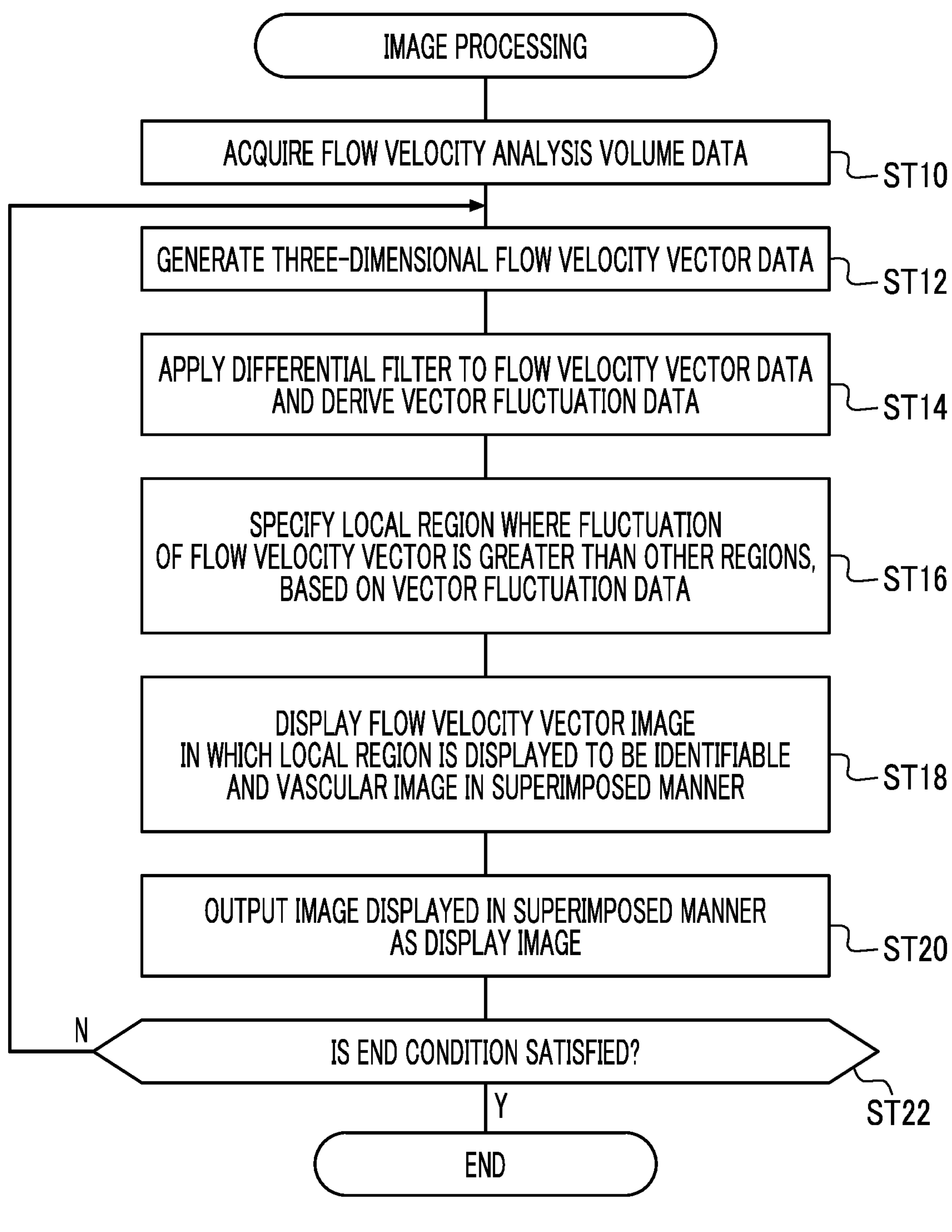
FIG. 9 is a flowchart illustrating an example of a flow of image processing.

In the image processing shown in FIG. 9, first, in Step ST10, the flow velocity vector image generation unit 24C acquires the flow velocity analysis volume data 39 from the storage 26. After the processing of Step ST10 is executed, the image processing proceeds to Step ST12.

In Step ST12, the flow velocity vector image generation unit 24C generates the flow velocity vector data 52 in the three-dimensional directions by executing the flow velocity vector derivation processing on the flow velocity analysis volume data 39 acquired in Step ST10. After Step ST12 is executed, the image processing proceeds to Step ST14.

In Step ST14, the vector fluctuation derivation unit 24D derives the vector fluctuation data 58 by applying the differential filter 56 to the flow velocity vector data 52 generated in Step ST12. After Step ST14 is executed, the image processing proceeds to Step ST16.

In Step ST16, the display image generation unit 24E changes the display aspect of the flow velocity vector image 54 based on the vector fluctuation data 58 derived in Step ST14. Specifically, the display image generation unit 24E generates the color data 62 based on the vector fluctuation data 58 and displays the RGB values according to each pixel of the flow velocity vector image 54 based on the color data 62. After the processing of Step ST16 is executed, the image processing proceeds to Step ST18.

In Step ST18, the display image generation unit 24E displays the flow velocity vector image 54 with the background color changed and the vascular image 46 in a superimposed manner. After the processing of Step ST18 is executed, the image processing proceeds to Step ST20.

In Step ST20, the display image generation unit 24E outputs the image displayed in a superimposed manner in Step ST18 as the display image 66 to the display device 16. After the processing of Step ST20 is executed, the image processing proceeds to Step ST22.

In Step ST22, the display image generation unit 24E determines whether or not a condition (hereinafter, referred to an "end condition") for ending the image processing is satisfied. An example of the end condition is a condition that an instruction to end the image processing is received by the reception device 14. In Step ST22, in a case where the end condition is not satisfied, determination is made to be negative, and the image processing proceeds to Step ST12. In Step ST22, in a case where the end condition is satisfied, determination is made to be affirmative, and the image processing ends.

As described above, with the medical service support device 10 according to the present embodiment, in the processor 24, the flow velocity vector of blood in the blood vessel is acquired, the fluctuation of the flow velocity vector is derived based on the flow velocity vector, and the display control for changing the display aspect according to the fluctuation of the flow velocity vector in the flow velocity vector image 54 obtained by visualizing the spatial distribution of the flow velocity vector is executed. Thus, because the display aspect is changed according to the fluctuation of the flow velocity vector in the flow velocity vector image 54, the user easily ascertains a place with large fluctuation of the flow velocity vector. For example, in the present configuration, because the display aspect changes (for example, color changes) according to the fluctuation of the flow velocity vector compared to a case where the flow velocity vector is displayed by an arrow in the flow velocity vector image 54, the user easily ascertain a characteristic place with large fluctuation of the flow velocity vector.

With the medical service support device 10 according to the present embodiment, the flow velocity vector image 54 is an image in which the mark indicating the direction of the flow velocity vector is included. Even in a case where the mark indicating the direction of the flow velocity vector is included in the flow velocity vector image 54, the display aspect of the fluctuation of the flow velocity vector in the flow velocity vector image 54 is changed, so that a place with large fluctuation of the flow velocity vector is easily visually understood.

With the medical service support device 10 according to the present embodiment, the background color of the mark is changed as the display aspect in the flow velocity vector image 54. In general, a form of the flow velocity vector is often a mark, such as an arrow, in the flow velocity vector image 54. That is, the flow velocity vector is often indicated by the orientation of the arrow. For this reason, the background color is changed, so that it is possible to make a place with large fluctuation of the flow velocity vector conspicuous with respect to other regions, compared to a case where a line width of the arrow indicating the flow velocity vector is changed in the flow velocity vector image 54. As a result, a place with large fluctuation of the flow velocity vector in the flow velocity vector image 54 is easily visually understood.

With the medical service support device 10 according to the present embodiment, the flow velocity vector is the velocity distribution data indicating the spatial distribution of the velocity components in the X direction, the Y direction, and the Z direction in the three-dimensional space in the blood vessel, and the fluctuation of the flow velocity vector is derived based on the flow velocity vector data 52 that is the velocity distribution data. For this reason, in the present configuration, the spatial fluctuation (that is, fluctuation in the three-dimensional space) of the flow velocity vector in the blood vessel can be ascertained.

With the medical service support device 10 according to the present embodiment, the fluctuation of the flow velocity vector is derived with the application of the differential filter 56 that derives the dissipation function of blood, to the flow velocity vector data 52. Motion of a viscous fluid, such as blood, causes frictional heat inside, and part of mechanical energy of the fluid becomes heat and is irreversibly dissipated. The dissipation function that indicates energy to be dissipated per unit volume and unit time shows a large value in a case where a velocity component in a certain direction sharply changes in the spatial direction, that is, in a case where the magnitude or direction of the velocity suddenly changes. For this reason, it is possible to evaluate the magnitude of change in magnitude or direction of the velocity from the quantity of the dissipation function, and it is easy to ascertain the fluctuation of the flow velocity vector.

With the medical service support device 10 according to the present embodiment, because the differential filter 56 is a filter that takes into consideration the dissipation function of each direction component of the three-dimensional space in the flow velocity vector, it is possible to ascertain the fluctuation of the flow velocity vector in the three-dimensional space.

With the medical service support device 10 according to the present embodiment, because it is possible to specify a place with large change of a fluid inside an anatomical site inside a living body, it is easy to find a lesion in the living body.

With the medical service support device 10 according to the present embodiment, because it is possible to specify a place with large change in blood flow, it is easy to find a lesion in the blood vessel.

In the above-described first embodiment, although a form example where the color is changed according to the fluctuation of the flow velocity vector as a display aspect has been described, the technique of the present disclosure is not limited thereto. For example, a thickness of an arrow indicating a flow velocity vector may be changed as a display aspect. In this case, as the fluctuation of the flow velocity vector is greater, the thickness of the arrow may be increased. A kind of a symbol (for example, in a region where the fluctuation of the flow velocity vector exceeds a value determined in advance, an arrow is displayed, and in other regions, a line is displayed) indicating the flow velocity vector may be changed as a display aspect.

In the above-described first embodiment, although a form example where the flow velocity vector data 52 is data indicating that velocity distribution in the three-dimensional space has been described, the technique of the present disclosure is not limited thereto. The flow velocity vector data 52 may be velocity distribution data in two dimensions.

In the above-described first embodiment, although a case where the fluctuation of the velocity and the direction of the flow velocity vector is derived in the vector fluctuation derivation unit 24D has been described as an example, the technique of the present disclosure is not limited thereto. In the vector fluctuation derivation unit 24D, the fluctuation of the velocity or the direction of the flow velocity vector may be derived. In this case, the flow velocity vector data is data indicating the velocity of the flow velocity vector of each voxel or data indicating the direction of the flow velocity vector of each voxel.

Second Embodiment

In the above-described first embodiment, although a form example where the background color is changed according to the fluctuation of the flow velocity vector in the flow velocity vector image 54 as the display aspect has been described, the technique of the present disclosure is not limited thereto. In a present second embodiment, only local regions 66A are displayed in a flow velocity vector image 54.

As shown in FIG. 10 as an example, the display image generation unit 24E acquires the vector fluctuation data 58 from the vector fluctuation derivation unit 24D. The display image generation unit 24E acquires a threshold value 70 from the storage 26. The threshold value 70 is a value that becomes a reference for extracting a fluctuation value of the flow velocity vector equal to or greater than a value determined in advance. The display image generation unit 24E acquires the flow velocity vector image 54 from the flow velocity vector image generation unit 24C.

The display image generation unit 24E specifies voxels showing a vector fluctuation value equal to or greater than the threshold value 70 based on the vector fluctuation data 58. Then, in the flow velocity vector image 54, only a region corresponding to pixels as a result of extraction is cut out and displayed. Thus, in the flow velocity vector image 54, only regions with large fluctuation of the flow velocity vector are displayed. Then, the display image generation unit 24E displays the flow velocity vector image 54 in which only the local regions 66A are cut out and displayed and the vascular image 46 in a superimposed manner to generate a display image 66.

Figure 11:
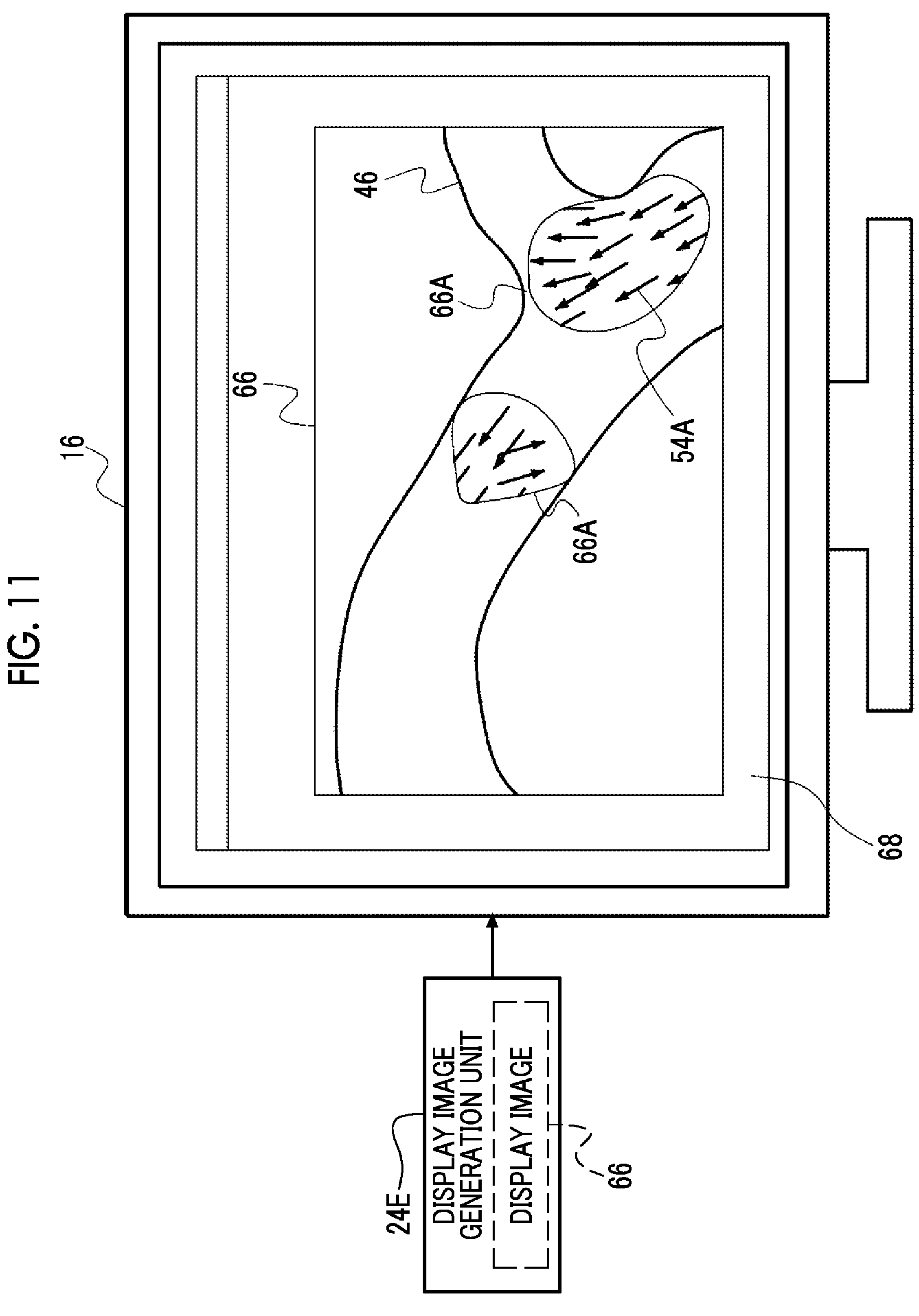
FIG. 11 is a conceptual diagram showing an example of an aspect in which the display image is displayed on the display device.

As shown in FIG. 11 as an example, the display image generation unit 24E performs graphical user interface (GUI) control for displaying the display image 66 to display a screen 68 on the display device 16. The GUI control is an example of "display control" according to the technique of the present disclosure. Thus, in the display image 66, only the local regions 66A with large fluctuation of the flow velocity vector on the vascular image 46 are displayed.

As described above, with the medical service support device 10 according to the present embodiment, in the processor 24, display control for displaying only the local regions 66A in the flow velocity vector image 54 on the vascular image 46 in a superimposed manner is performed. Thus, because the flow velocity vectors are displayed only in the local region 66A in the display image 66, the user can ascertain a place with large fluctuation of the flow velocity vector in the flow velocity vector image 54.

In the above-described second embodiment, although a form example where the threshold value 70 is the value determined in advance has been described, the technique of the present disclosure is not limited thereto. For example, the threshold value 70 may be a variable value that is set by the user through the reception device 14. Alternatively, the threshold value 70 may be a value that is derived according to a thickness, a shape, and an in-vivo position (for example, a distance from the heart) of a blood vessel shown by the vascular image 46.

In the first embodiment, the vascular image 46 is generated, and the vascular image 46 and the flow velocity vector image 54 are displayed in a superimposed manner, and in the second embodiment, the vascular image 46 and only the local regions 66A in the flow velocity vector image 54 are displayed in a superimposed manner; however, the technique of the present disclosure is not limited thereto. Display control for displaying the flow velocity vector image 54 or the flow velocity vector image 54 only with the local regions 66A may be performed without generating the vascular image 46.

In the first embodiment, although the flow velocity vector image 54 that includes the mark indicating the direction of the flow velocity vector is generated, and the flow velocity vector image 54 in which the background color of the mark of the generated flow velocity vector image 54 changes according to the fluctuation of the flow velocity vector is generated, the technique of the present disclosure is not limited thereto. A flow velocity vector image 54B (not shown) in which the mark indicating the direction of the flow velocity vector is disposed for each voxel and a flow velocity vector image 54C (not shown) in which a display aspect according to the fluctuation of the flow velocity vector is set for each voxel may be generated, and the images may be combined to generate the flow velocity vector image 54. As in the second embodiment, local regions with the fluctuation of the flow velocity vector equal to or greater than the threshold value may be specified based on the flow velocity vector image 54C in which the display aspect according to the fluctuation of the flow velocity vector is set, the local regions of the flow velocity vector image 54B and the flow velocity vector image 54C including other regions than the local regions may be combined to generate the flow velocity vector image 54, or the local regions of the flow velocity vector image 54C and the flow velocity vector image 54B including other regions than the local regions may be combined to generate the flow velocity vector image 54.

In each embodiment described above, although a form example where the flow of blood in the blood vessel is visualized has been described, the technique of the present disclosure is not limited thereto. For example, the technique of the present disclosure may be applied to a case where a lymphatic vessel is used instead of the blood vessel, a lymphatic fluid is used instead of blood, and the flow of the lymphatic fluid in the lymphatic vessel is visualized. Alternatively, the technique of the present disclosure may be applied to a case where a flow of a fluid (for example, water that flows in a water pipe) in a pipe is visualized.

In each embodiment described above, although the three-dimensional volume data 15 includes both the three-dimensional image 38 and the flow velocity analysis volume data 39, the technique of the present disclosure is not limited thereto. The three-dimensional volume data 15 may be composed of first three-dimensional volume data 15 including three-dimensional image 38 and second three-dimensional volume data 15 including the flow velocity analysis volume data 39. For example, the modality 11 associated as an imaging apparatus of the three-dimensional image 38 and the modality 11 associated as an imaging apparatus of the flow velocity analysis volume data 39 may be different.

In each embodiment described above, although a form example where the image processing is executed by the processor 24 of the image processing device 12 included in the medical service support device 10 has been described, the technique of the present disclosure is not limited thereto, and a device that executes the image processing may be provided outside the medical service support device 10.

Figure 12:
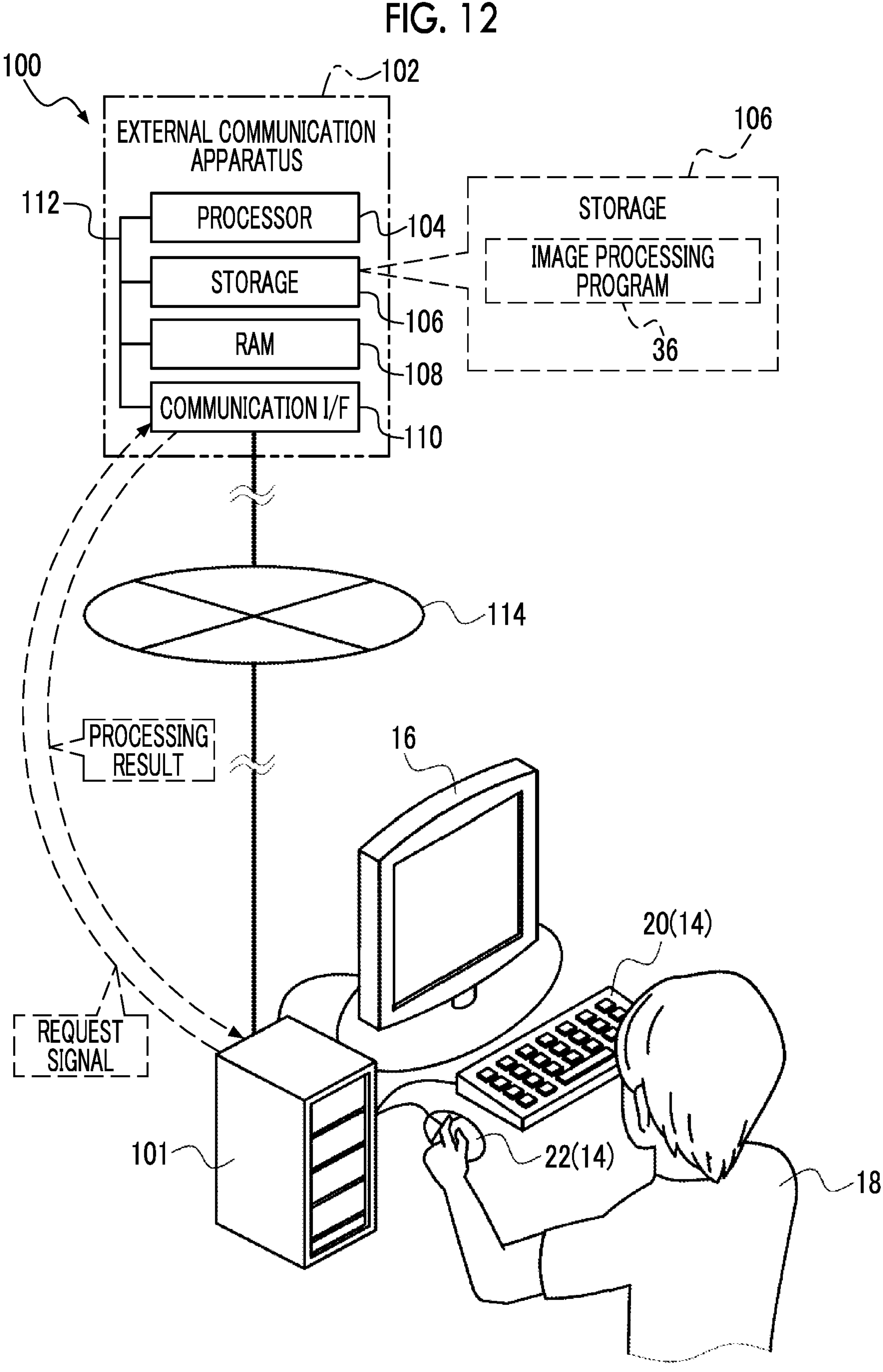
FIG. 12 is a conceptual diagram showing a schematic configuration of a medical service support system.

In this case, as shown in FIG. 12 as an example, a medical service support system 100 may be used. The medical service support system 100 comprises an information processing apparatus 101 and an external communication apparatus 102. The information processing apparatus 101 is a device in which the image processing program 36 is removed from the storage 26 of the image processing device 12 that is included in the medical service support device 10 described in the above-described embodiments. The external communication apparatus 102 is, for example, a server. The server is realized by, for example, a main frame. Here, although the main frame has been illustrated, this is merely an example, and the server may be realized by cloud computing or may be realized by network computing, such as fog computing, edge computing, or grid computing. Here, although the server is illustrated as an example of the external communication apparatus 102, this is merely an example, and instead of the server, at least one personal computer or the like may be used as the external communication apparatus 102.

The external communication apparatus 102 comprises a processor 104, a storage 106, a RAM 108, and a communication I/F 110, and the processor 104, the storage 106, the RAM 108, and the communication I/F 110 are connected by a bus 112. The communication I/F 110 is connected to the information processing apparatus 101 via a network 114. The network 114 is, for example, the Internet. The network 114 is not limited to the Internet, and may be a WAN and/or a LAN, such as an intranet.

In the storage 106, the image processing program 36 is stored. The processor 104 executes the image processing program 36 on the RAM 108. The processor 104 executes the above-described image processing following the image processing program 36 that is executed on the RAM 108.

The information processing apparatus 101 transmits a request signal for requesting the execution of the image processing to the external communication apparatus 102. The communication I/F 110 of the external communication apparatus 102 receives the request signal via the network 114. The processor 104 executes the image processing following the image processing program 36 and transmits a processing result to the information processing apparatus 101 via the communication I/F 110. The information processing apparatus 101 receives the processing result (for example, a processing result by the vascular image generation unit 24B) transmitted from the external communication apparatus 102 with the communication I/F 30 (see FIG. 2) and outputs the received processing result to various devices, such as the display device 16.

In the example shown in FIG. 12, the external communication apparatus 102 is an example of an "image processing device" according to the technique of the present disclosure, and the processor 104 is an example of a "processor" according to the technique of the present disclosure.

The image processing may be distributed to and executed by a plurality of devices including the information processing apparatus 101 and the external communication apparatus 102. In the above-described embodiments, although the three-dimensional image 38 is stored in the storage 26 of the medical service support device 10, an aspect may be made in which the three-dimensional image 38 is stored in the storage 106 of the external communication apparatus 102 and is acquired from the external communication apparatus 102 via the network before the image processing is executed.

In the above-described embodiments, although a form example where the image processing program 36 is stored in the storage 26 has been described, the technique of the present disclosure is not limited thereto. For example, the image processing program 36 may be stored in a storage medium (not shown), such as an SSD or a USB memory. The storage medium is a portable non-transitory computer readable storage medium. The image processing program 36 that is stored in the storage medium is installed on the medical service support device 10. The processor 24 executes the image processing following the image processing program 36.

The image processing program 36 may be stored in a storage device of another computer, a server, or the like connected to the medical service support device 10 via the network, the image processing program 36 may be downloaded according to a request of the medical service support device 10 and may be installed on the medical service support device 10. That is, the program (program product) described in the present embodiment may be provided by a recording medium or may be distributed from an external computer.

The entire image processing program 36 is not required to be stored in the storage device of another computer, the server, or the like connected to the medical service support device 10 or in the storage 26, and a part of the image processing program 36 may be stored. The storage medium, the storage device of another computer, the server, or the like connected to the medical service support device 10, and other external storages are placed as a memory that is connected to the processor 24 directly or indirectly and are used.

In the above-described embodiments, although the processor 24, the storage 26, the RAM 28, and the communication I/F 30 of the image processing device 12 are illustrated as a computer, the technique of the present disclosure is not limited thereto, and instead of the computer, a device including an application specific integrated circuit (ASIC), a field-programmable gate array (FPGA), and/or a programmable logic device (PLD) may be applied. Instead of the computer, a combination of a hardware configuration and a software configuration may be used.

As a hardware resource for executing the image processing described in the above-described embodiments, various processors described below can be used. Examples of the processors include a CPU that is a general-purpose processor configured to execute software, that is, the program to function as the hardware resource for executing the image processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the image processing.

The hardware resource for executing the image processing may be configured with one of various processors or may be configured with a combination of two or more processors (for example, a combination of a plurality of FPGAs or a combination of a CPU and an FPGA) of the same type or different types. The hardware resource for executing the image processing may be one processor.

As an example where the hardware resource is configured with one processor, first, there is a form in which one processor is configured with a combination of one or more CPUs and software, and the processor functions as the hardware resource for executing the image processing. Second, as represented by System-on-a-chip (SoC) or the like, there is a form in which a processor that realizes all functions of a system including a plurality of hardware resources for executing the image processing into one integrated circuit (IC) chip is used. In this way, the image processing is realized using one or more processors among various processors described above as a hardware resource.

As the hardware structures of various processors, more specifically, an electric circuit in which circuit elements, such as semiconductor elements, are combined can be used. The above-described image processing is just an example. Accordingly, it goes without saying that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configurations, functions, operations, and advantageous effects is description relating to an example of configurations, functions, operations, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

In regard to the above-described embodiment, the following supplementary notes will be further disclosed.

Supplementary Note 1

An image processing device comprising:

a processor, in which the processor is configured to:

acquire a flow velocity vector of a fluid in a structure;

generate a flow velocity vector image obtained by visualizing a spatial distribution of the flow velocity vector; and perform display control for changing a display aspect according to a magnitude of fluctuation of the flow velocity vector, in the flow velocity vector image.

Supplementary Note 2

The image processing device according to Supplementary Note 1, in which the flow velocity vector image is an image in which a mark indicating a direction of the flow velocity vector is included.

Supplementary Note 3

The image processing device according to Supplementary Note 2, in which the display aspect is a background color of the mark.

Supplementary Note 4

The image processing device according to Supplementary Note 1, in which the display control is control for displaying a local region having the magnitude of the fluctuation of the flow velocity vector equal to or greater than a threshold value set in advance, in the flow velocity vector image.

Supplementary Note 5

The image processing device according to any one of Supplementary Note 1 to

Supplementary Note 4, in which the flow velocity vector is velocity distribution data indicating a spatial distribution of velocity components in a plurality of directions in the structure, and the fluctuation of the flow velocity vector is derived based on the velocity distribution data.

Supplementary Note 6

The image processing device according to Supplementary Note 5, in which the fluctuation of the flow velocity vector is derived based on a value obtained by applying a differential filter to the velocity distribution data, and the differential filter is a filter that derives a dissipation function of the fluid in the structure.

Supplementary Note 7

The image processing device according to Supplementary Note 6, in which the differential filter is a filter that derives the dissipation function of the velocity components in three dimensions in the structure.

Supplementary Note 8

The image processing device according to any one of Supplementary Note 1 to

Supplementary Note 7, in which the structure is an anatomical site in a living body.

Supplementary Note 9

The image processing device according to Supplementary Note 8, in which the anatomical site is a blood vessel, and the fluid is blood.

What is claimed is:

1. An image processing device comprising:

a processor, that is configured to:

acquire a flow velocity vector of a fluid in a structure;

generate a flow velocity vector image obtained by visualizing a spatial distribution of the flow velocity vector, wherein the flow velocity vector is velocity distribution data indicating a spatial distribution of velocity components in a plurality of directions in the structure, and the fluctuation of the flow velocity vector is derived based on a value obtained by applying a differential filter to the velocity distribution data, and wherein the differential filter is a filter that derives a dissipation function of the fluid in the structure; and perform display control for changing a display aspect according to a magnitude of fluctuation of the flow velocity vector, in the flow velocity vector image.

2. The image processing device according to claim 1, wherein the flow velocity vector image is an image in which a mark indicating a direction of the flow velocity vector is included.

3. The image processing device according to claim 2, wherein the display aspect is a background color of the mark.

4. The image processing device according to claim 1, wherein the display control is control for displaying a local region having the magnitude of the fluctuation of the flow velocity vector equal to or greater than a threshold value set in advance, in the flow velocity vector image.

5. The image processing device according to claim 1, wherein the differential filter is a filter that derives the dissipation function of the velocity components in three dimensions in the structure.

6. The image processing device according to claim 1, wherein the structure is an anatomical site in a living body.

7. The image processing device according to claim 6, wherein the anatomical site is a blood vessel, and the fluid is blood.

8. An image processing method comprising:

acquiring a flow velocity vector of a fluid in a structure;

generating a flow velocity vector image obtained by visualizing a spatial distribution of the flow velocity vector, wherein the flow velocity vector is velocity distribution data indicating a spatial distribution of velocity components in a plurality of directions in the structure, and the fluctuation of the flow velocity vector is derived based on a value obtained by applying a differential filter to the velocity distribution data, and wherein the differential filter is a filter that derives a dissipation function of the fluid in the structure; and performing display control for changing a display aspect according to a magnitude of fluctuation of the flow velocity vector, in the flow velocity vector image.

9. A non-transitory computer-readable storage medium storing a program that causes a computer to execute a process, the process comprising:

acquiring a flow velocity vector of a fluid in a structure;

generating a flow velocity vector image obtained by visualizing a spatial distribution of the flow velocity vector, wherein the flow velocity vector is velocity distribution data indicating a spatial distribution of velocity components in a plurality of directions in the structure, and the fluctuation of the flow velocity vector is derived based on a value obtained by applying a differential filter to the velocity distribution data, and wherein the differential filter is a filter that derives a dissipation function of the fluid in the structure; and performing display control for changing a display aspect according to a magnitude of fluctuation of the flow velocity vector, in the flow velocity vector image.

* * * * *